US011933318B2

(12) United States Patent
Chavez Sandoval et al.

(10) Patent No.: US 11,933,318 B2
(45) Date of Patent: Mar. 19, 2024

(54) METHOD FOR ASSEMBLING A PUMP SECTION AND A FLUID PUMP INCLUDING THE PUMP SECTION

(71) Applicant: DELPHI TECHNOLOGIES IP LIMITED, St. Michael (BB)

(72) Inventors: Cesar Cain Chavez Sandoval, Cd. Juarez (MX); Alberto Calderon Rodriguez, Cd. Juarez (MX)

(73) Assignee: DELPHI TECHNOLOGIES IP LIMITED, St. Michael (BB)

(*) Notice: Subject to any disclaimer, the term of this patent is extended or adjusted under 35 U.S.C. 154(b) by 0 days.

(21) Appl. No.: 17/890,349

(22) Filed: Aug. 18, 2022

(65) Prior Publication Data

US 2024/0060512 A1 Feb. 22, 2024

(51) Int. Cl.
*F04D 29/52* (2006.01)
*F04D 29/64* (2006.01)
*F02M 59/48* (2006.01)

(52) U.S. Cl.
CPC ......... *F04D 29/648* (2013.01); *F04D 29/528* (2013.01); *F02M 59/48* (2013.01)

(58) Field of Classification Search
CPC ...... F04D 29/648; F04D 29/528; F02M 59/48
See application file for complete search history.

(56) References Cited

U.S. PATENT DOCUMENTS 4,063,059 A * 12/1977 Brolund ................ B08B 15/002 266/65
4,401,416 A 8/1983 Tuckey
4,784,587 A 11/1988 Takei et al.
5,207,084 A * 5/1993 West ....................... B21F 45/16 470/195
5,425,625 A 6/1995 Hsu
5,997,262 A 12/1999 Finkbeiner et al.
6,769,889 B1 8/2004 Raney et al.
10,830,251 B2 11/2020 Castillo et al.
2005/0163627 A1 7/2005 Morris et al.
2011/0315266 A1* 12/2011 Viviroli .................. B65H 57/14 140/147
2020/0106330 A1 4/2020 Kobayashi et al.
2020/0309118 A1 10/2020 Sakamoto et al.

FOREIGN PATENT DOCUMENTS

WO 2016194598 A1 12/2016

* cited by examiner

*Primary Examiner* — Rick K Chang
(74) *Attorney, Agent, or Firm* — WARNER NORCROSS + JUDD LLP

(57) ABSTRACT

An method for assembling a pump section of a fluid pump is provided. The method includes the steps of providing a pump inlet plate and a pump outlet plate, wherein the inlet plate includes an inlet plate slot and the outlet plate includes a complementary outlet plate slot; feeding a metal wire from a supply of metal wire to a straightener; pulling the metal wire through the straightener to reduce a bend in the metal wire; guiding the metal wire to one of the inlet plate and outlet plate; causing the metal wire to be inserted into the slot of the said one of the inlet plate and outlet plate; and cutting the metal wire at a desired length such that a portion of the cut wire remains extending from said slot. A pump section formed by the method and a fluid pump including the pump section are also disclosed.

18 Claims, 15 Drawing Sheets

METHOD FOR ASSEMBLING A PUMP SECTION AND A FLUID PUMP INCLUDING THE PUMP SECTION

FIELD OF THE INVENTION

The disclosure generally relates to fluid pumps and, more specifically, to a method for assembling a pump section of a fluid pump, and a fluid pump including the pump section assembled by the method.

BACKGROUND OF THE INVENTION

Fluid pumps, and more particularly fuel pumps for pumping fuel, for example, from a fuel tank of a motor vehicle to an internal combustion engine of the motor vehicle, are known. For example, a typical electric fuel pump includes a rotatable impeller located axially between stationary inlet and outlet plates. Rotation of the impeller by an electric motor pumps fuel to an outlet of the fuel pump such that an armature of the electric motor is located in the flow path taken by the fuel in order for the fuel to reach the outlet of the fuel pump. During manufacture, the inlet plate, the impeller, and the outlet plate form a pump section subassembly which is subsequently inserted into a housing of the fuel pump. Later, the ends of the housing are joined such as by crimping, which applies an axial load on the inlet plate and the outlet plate of the pump section subassembly and in turn prevents relative rotation between the inlet plate and the outlet plate. Proper orientation of the inlet plate relative to the outlet plate is important for optimal efficiency of the fuel pump in use. Therefore, the inlet plate, impeller, and outlet plate need to be maintained as a subassembly prior to the ends of the housing being crimped or otherwise joined, without disturbing the alignment and orientation of the inlet plate relative to the outlet plate.

In one known arrangement, the inlet plate and outlet plate of the pump section subassembly each include two slots along an outer peripheral surface of the inlet plate and outlet plate. The slots of the inlet plate and the slots of the outlet plate are radially arranged along the circumference of the outer peripheral surfaces such that when the slots of the inlet plate are aligned with the slots of the outlet plate, the inlet plate is properly oriented relative to the outlet plate. Once in this orientation, a pre-manufactured clip is inserted into each of the two aligned combinations of inlet plate slot and outlet plate slot. The clips hold the pump section subassembly together and in a proper orientation for moving and handling the subassembly until it is secured in the housing a the fuel pump.

BRIEF SUMMARY

An improved method for assembling a pump section subassembly of a fluid pump is provided. The method includes the step of providing a pump inlet plate and a pump outlet plate, wherein the inlet plate includes an inlet plate slot and the outlet plate includes a complementary outlet plate slot. The method also includes the step of feeding a metal wire from a supply of metal wire to a straightener. The method further includes the step of pulling the metal wire through the straightener to reduce a bend in the metal wire. The method further includes the step of guiding the metal wire to one of the inlet plate and outlet plate. The method further includes the step of causing the metal wire to be inserted into the slot of the said one of the inlet plate and outlet plate. The method further includes the step of cutting the metal wire at a desired length such that a portion of the cut wire remains extending from said slot.

In specific embodiments, the method further includes the steps of aligning the outlet plate slot with the inlet plate slot, and placing the inlet plate on top of the outlet plate such that the portion of cut wire extending from the slot in the said one of the inlet plate and outlet plate is received in the slot in the other of the inlet plate and outlet plate, thereby aligning and axially securing the inlet and outlet plates together.

In specific embodiments, the method further includes the step of stamping the metal wire with a forming tool after reducing the bend in the metal wire with the straightener.

In particular embodiments, the step of stamping forms holes in the metal wire along an edge of the metal wire to create deformation zones in which the width of the metal wire is made larger.

In particular embodiments, the forming tool is a punch.

In specific embodiments, the method further includes the step of providing vacuum suction to remove any loose particles generated during the method.

In specific embodiments, the metal wire is a round wire, a square wire, or a flat strip of wire.

In specific embodiments, the supply of metal wire is a roll of wire.

In specific embodiments, the straightener is a set of rollers including at least one pair of rolls.

In specific embodiments, the step of pulling includes feeding the wire through a pair of feed rollers.

In particular embodiments, the feed rollers include a drive roll and a corresponding idler roll.

In specific embodiments, at least one of the inlet plate slot and the outlet plate slot includes a recessed portion formed at a terminal end of said slot.

In specific embodiments, the inlet plate includes an inlet plate outer peripheral surface and also includes an axially extending inlet plate opening in the inlet plate outer peripheral surface. The outlet plate includes an outlet plate outer peripheral surface and also includes an axially extending outlet plate opening in the outlet plate outer peripheral surface.

In particular embodiments, the inlet plate includes an inlet plate groove adjacent the inlet plate opening; and the outlet plate includes an outlet plate groove adjacent the outlet plate opening.

In certain embodiments, the inlet plate groove is continuous with the inlet plate slot; and the outlet plate groove is continuous with the outlet plate slot.

In specific embodiments, the inlet plate includes a second inlet plate slot and the outlet plate includes a corresponding second outlet plate slot. The method further includes the steps of causing the metal wire to be inserted into the second slot of the said one of the inlet plate and outlet plate, and cutting the wire at a desired length such that a portion of the wire remains extending from the second slot.

A pump section formed by the method, and a fluid pump including the pump section, are also disclosed.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A method of assembling a pump section of a fluid pump is provided. A pump section formed by the method and a fluid pump including the pump section are also provided. Referring to FIGS. 1-16, wherein like numerals indicate corresponding parts throughout the several views, the fluid pump is illustrated by way of example as a fuel pump 10 for pumping liquid fuel, for example gasoline, from a fuel tank (not shown) to an internal combustion engine (not shown). While the fluid pump is illustrated as fuel pump 10, it should be understood that the invention is not to limited to a fuel pump, and can also be applied to fluid pumps for pumping fluids other than fuel.

Figure 1:
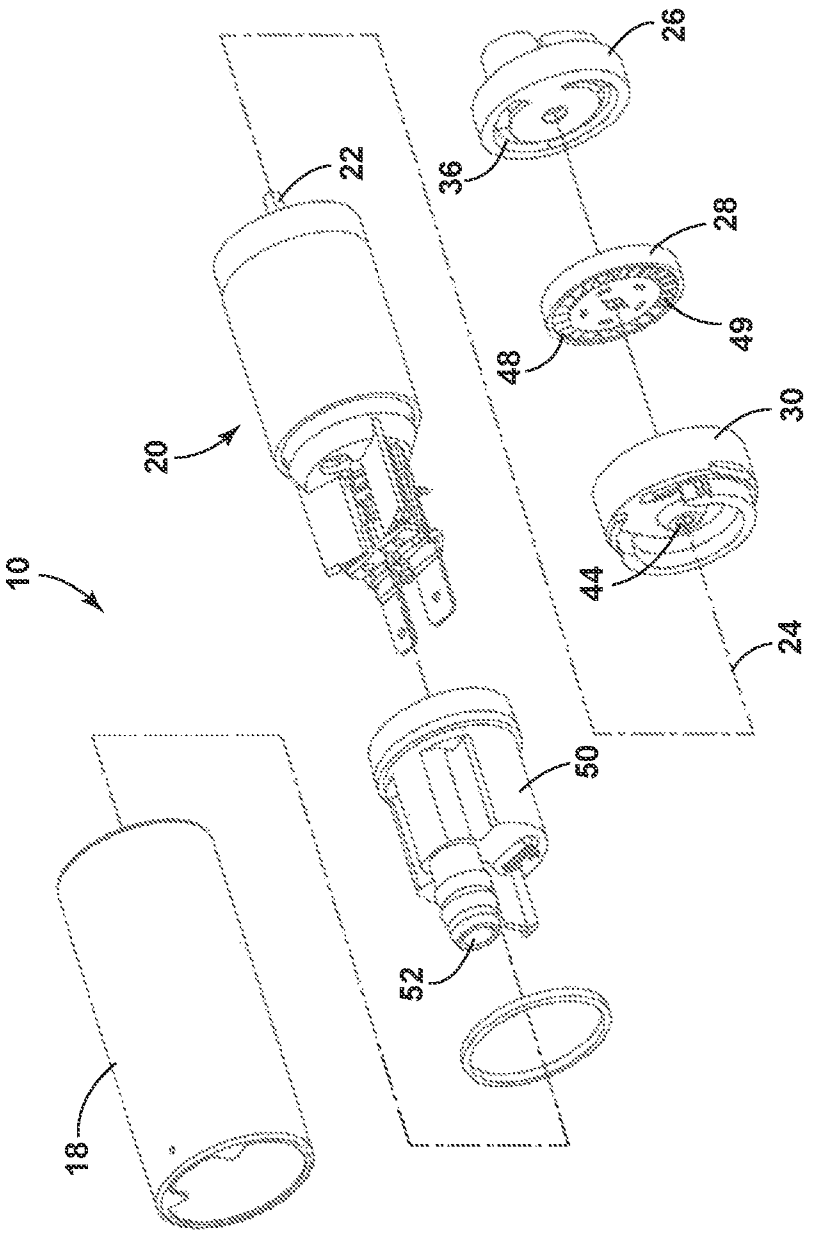
FIG. 1 is an exploded perspective view of a fluid pump including a pump section assembled by a method in accordance with some embodiments of the disclosure.
Figure 2:
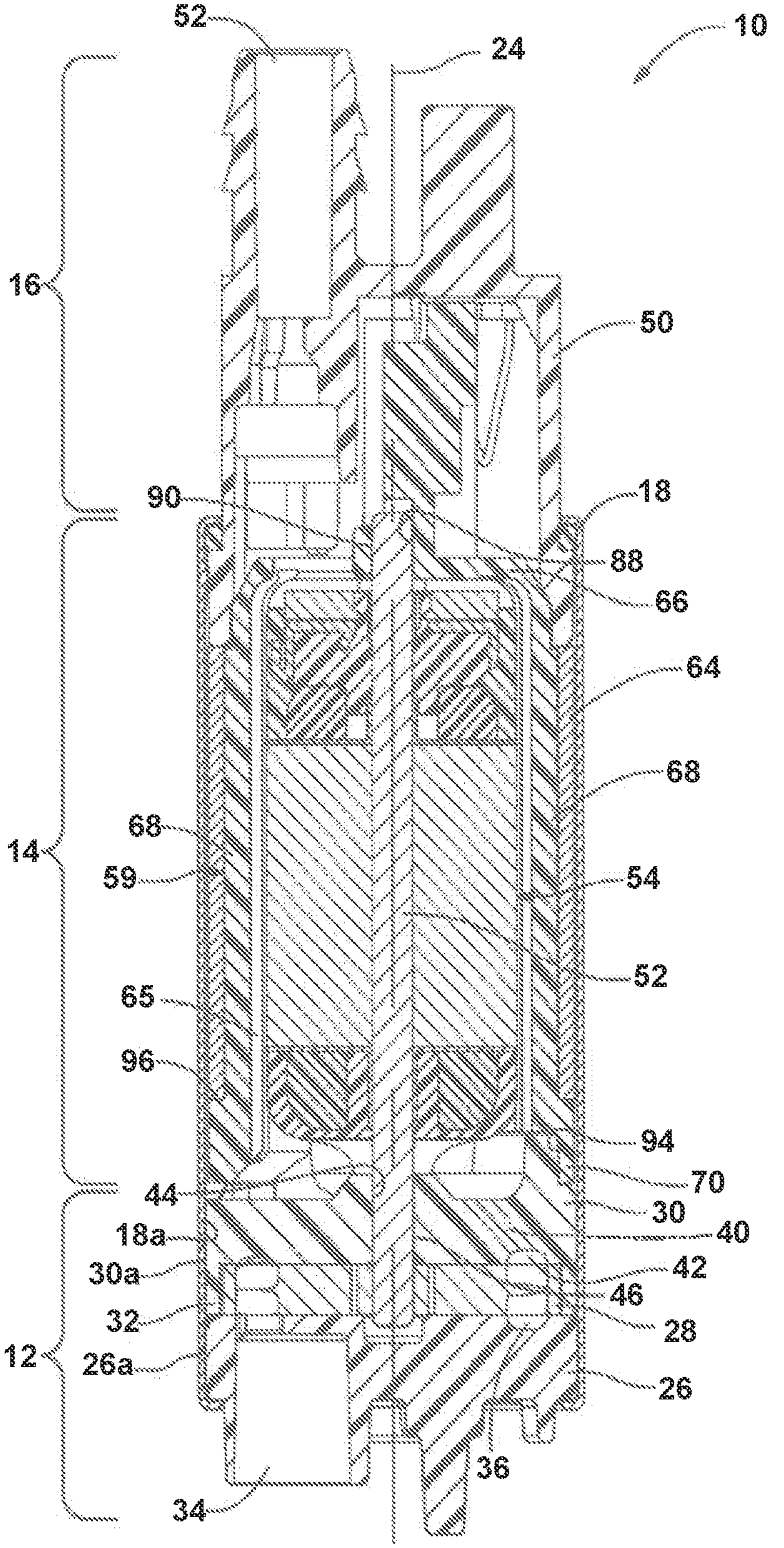
FIG. 2 is an axial cross-section al view of the fluid pump of FIG. 1.
Figure 3:
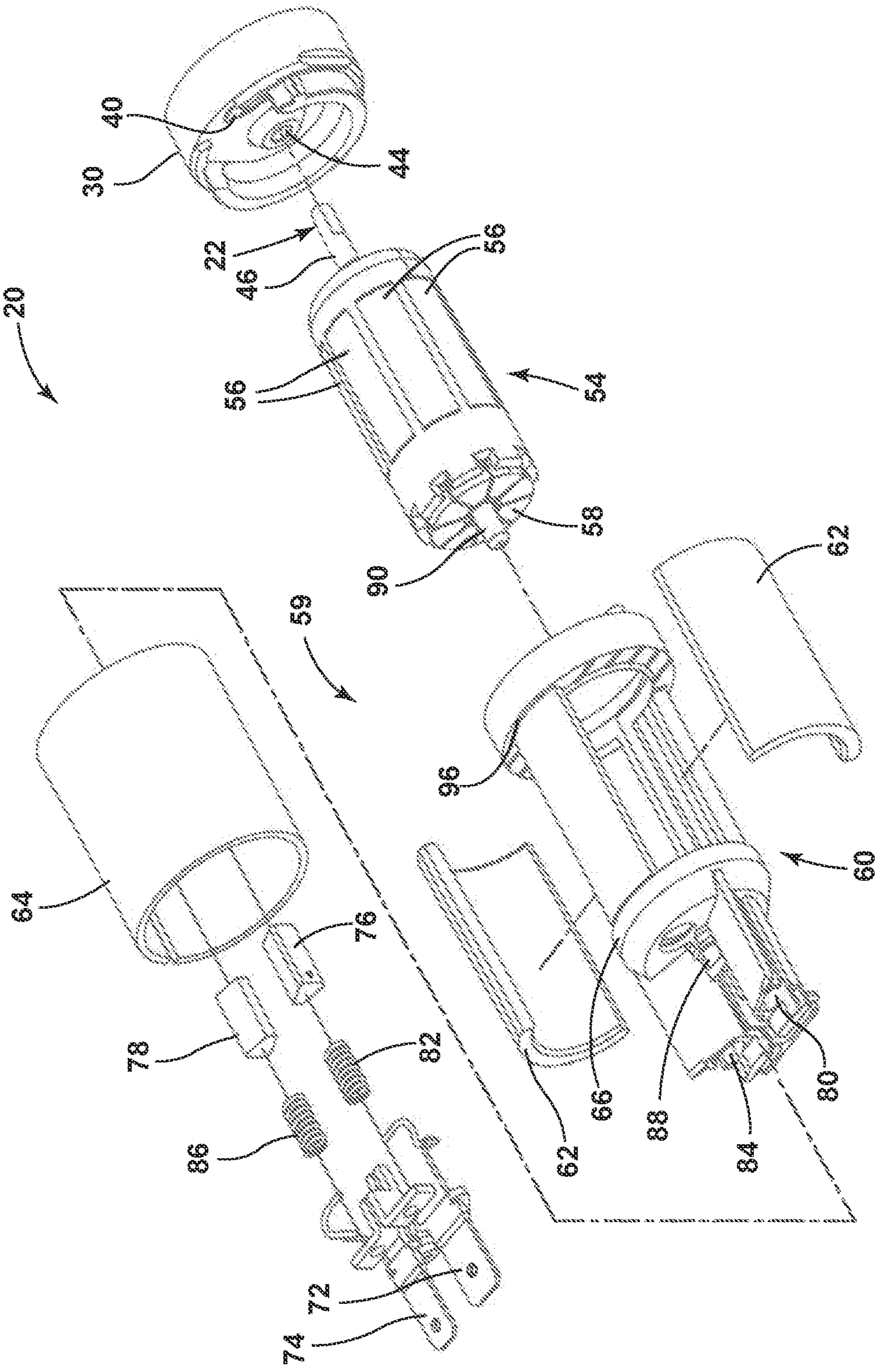
FIG. 3 is an exploded perspective view of a portion of the fluid pump of FIG. 1.
Figure 4:
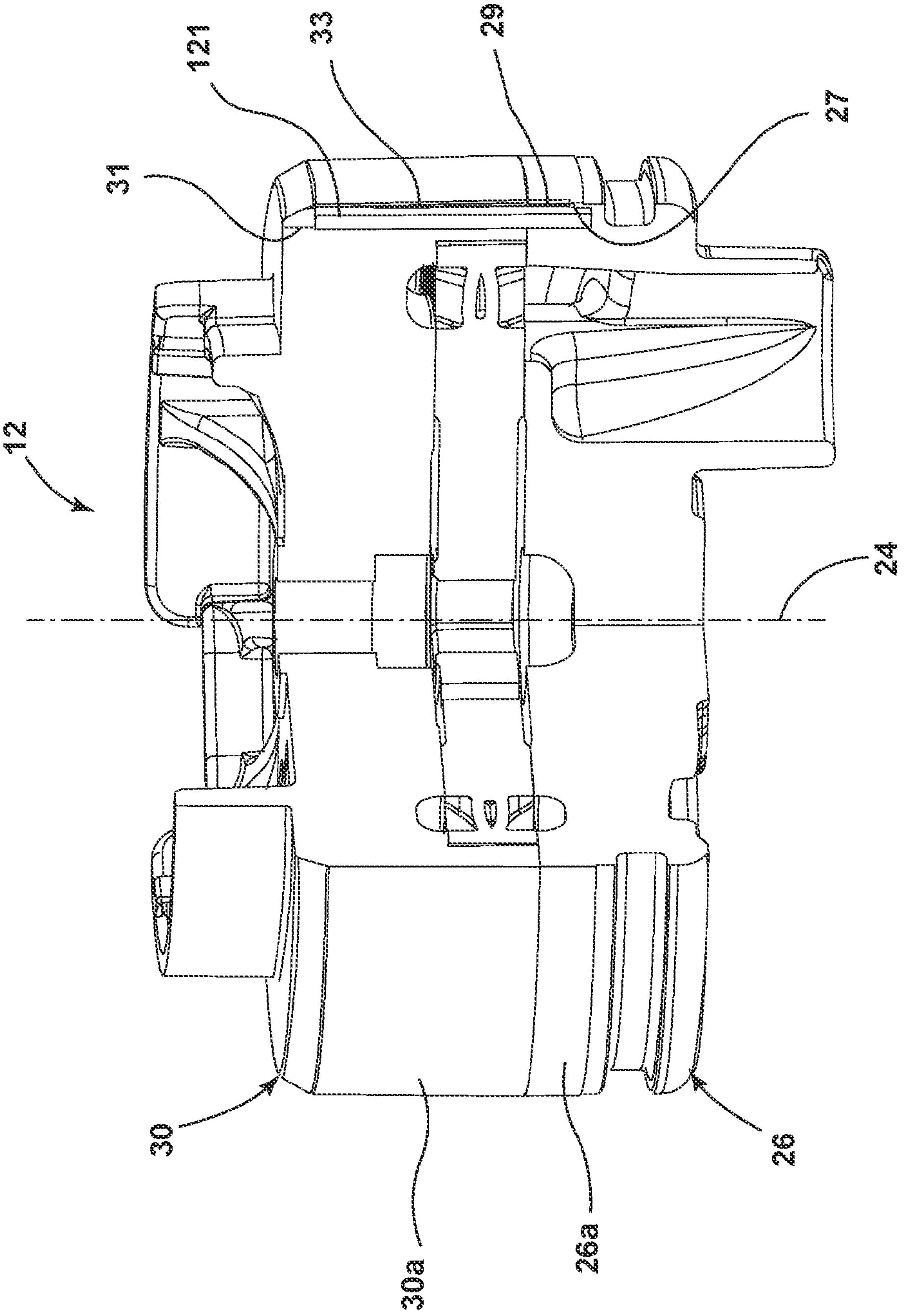
FIG. 4 is a partial sectional view of the pump section assembled in accordance with some embodiments of the disclosure.
Figure 5:
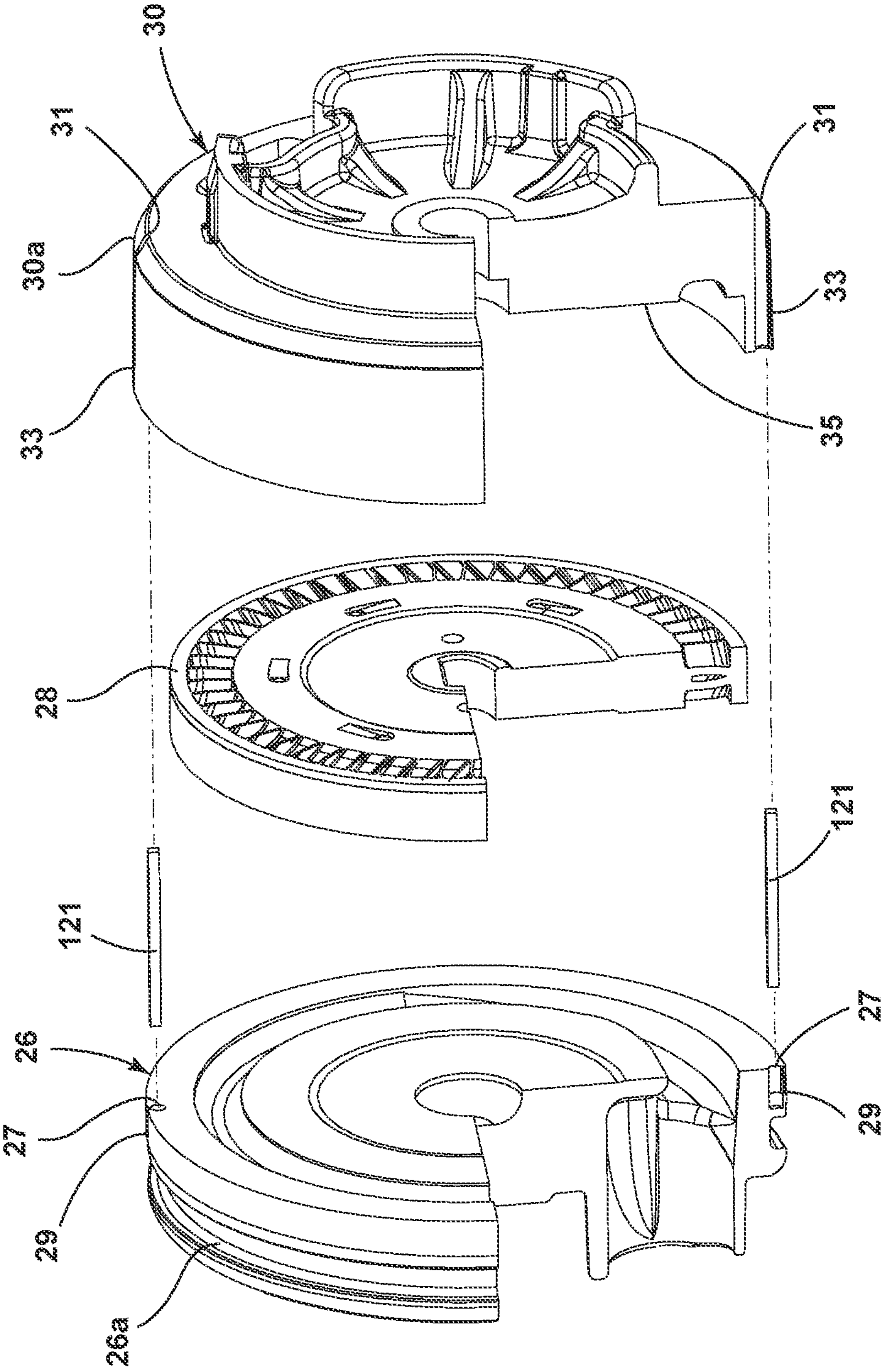
FIG. 5 is an exploded perspective view of the pump section of FIG. 4.

With reference first to FIGS. 1-3, the fuel pump 10 generally includes a pump section 12 at one end, a motor section 14 adjacent to the pump section 12, and an outlet section 16 adjacent to the motor section 14 at the end of fuel pump 10 opposite the pump section 12. A housing 18 of the fuel pump 10 retains the pump section 12, the motor section 14 and the outlet section 16 together. Fuel enters the fuel pump 10 at the pump section 12, a portion of which is rotated by the motor section 14, and is pumped past the motor section 14 to the outlet section 16 where the fuel exits the fuel pump 10. The motor section 14 includes an electric motor 20 which is disposed within the housing 18. The electric motor 20 includes a shaft 22 extending therefrom into the pump section 12. The shaft 22 rotates about an axis 24 when an electric current is applied to the electric motor 20.

The pump section 12 includes an inlet plate 26, a pumping element illustrated as impeller 28, and an outlet plate 30. The inlet plate 26 is disposed at the end of pump section 12 that is distal from the motor section 14 while the outlet plate 30 is disposed at the end of pump section 12 that is proximal to the motor section 14. Both the inlet plate 26 and the outlet plate 30 are fixed relative to the housing 18 to prevent relative movement between the inlet plate 26 and the outlet plate 30 with respect to the housing 18. The outlet plate 30 defines a spacer ring 32 on the side of the outlet plate 30 that faces toward the inlet plate 26. The impeller 28 is disposed axially between the inlet plate 26 and the outlet plate 30 such that the impeller 28 is radially surrounded by the spacer ring 32. The impeller 28 is fixed to the shaft 22 such that the impeller 28 rotates with the shaft 22 in a one-to-one relationship. The spacer ring 32 is dimensioned to be slightly thicker than the dimension of the impeller 28 in the direction of the axis 24, i.e. the dimension of the spacer ring 32 in the direction of axis 24 is greater than the dimension of the impeller 28 in the direction of axis 24. In this way, the inlet plate 26, the outlet plate 30, and the spacer ring 32 are fixed within the housing 18, for example by crimping the axial ends of the housing 18. Axial forces created by the crimping process are carried by the spacer ring 32, thereby preventing the impeller 28 from being clamped tightly between the inlet plate 26 and the outlet plate 30 which would prevent the impeller 28 from rotating freely. The spacer ring 32 is also dimensioned to have an inside diameter that is larger than the outside diameter of the impeller 28 to allow the impeller 28 to rotate freely within the spacer ring 32 and axially between the inlet plate 26 and the outlet plate 30. While the pumping element has been illustrated as impeller 28, it should now be understood that other pumping elements may alternatively be used, by way of non-limiting example only, a gerotor, gears, or roller vanes. Furthermore, while the spacer ring 32 is illustrated as being made as a single piece with the outlet plate 30, it should be understood that the spacer ring 32 may alternatively be made as a separate piece that is captured axially between the outlet plate 30 and the inlet plate 26.

The inlet plate 26 is generally cylindrical in shape, and includes an inlet 34 that extends through the inlet plate 26 in the same direction as axis 24. The inlet 34 is a passage which introduces fuel into the fuel pump 10. The inlet plate 26 also includes an inlet plate flow channel 36 formed in the face of the inlet plate 26 that faces toward the impeller 28. The inlet plate flow channel 36 is in fluid communication with the inlet 34. The outlet plate 30 is also generally cylindrical in shape and includes an outlet plate outlet passage 40 that extends through the outlet plate 30 in the same direction as axis 24 where it should be noted that the outlet plate outlet passage 40 is an outlet for pump section 12. The outlet plate outlet passage 40 is in fluid communication with the outlet section 16. The outlet plate 30 also includes an outlet plate flow channel 42 formed in the face of the outlet plate 30 that faces toward the impeller 28. The outlet plate flow channel 42 is in fluid communication with the outlet plate outlet passage 40. The outlet plate 30 also includes an outlet plate aperture, hereinafter referred to as lower bearing 44, extending through the outlet plate 30. The shaft 22 extends through the lower bearing 44 in a close fitting relationship such that the shaft 22 is able to rotate freely within the lower bearing 44 and such that radial movement of the shaft 22 within the lower bearing 44 is limited to the manufacturing tolerances of the shaft 22 and the lower bearing 44. In this way, the lower bearing 44 radially supports a lower end 46 of the shaft 22 that is proximal to the pump section 12.

The impeller 28 includes a plurality of impeller blades 48 arranged in a polar array radially surrounding and centered about axis 24 such that the impeller blades 48 are aligned with the inlet plate flow channel 36 and the outlet plate flow channel 42. The impeller blades 48 are each separated from each other by an impeller blade chamber 49 that passes through the impeller 28 in the general direction of axis 24. The impeller 28 may be made, for example, by a plastic injection molding process in which the preceding features of the impeller 28 are integrally molded as a single piece of plastic. However, the impeller 28 is not limited to such a construction.

The outlet section 16 includes an end cap 50 having an outlet 52 for discharging fuel from the fuel pump 10. The outlet 52 may be connected to, for example, a conduit (not shown) for supplying fuel to an internal combustion engine (not shown). The outlet 52 is in fluid communication with the outlet plate outlet passage 40 of the outlet plate 30 for receiving fuel that has been pumped by the pump section 12.

The electric motor 20 includes a rotor or armature 54 having a plurality of circumferentially spaced motor windings 56, and a commutator portion 58 through which the shaft 22 extends in each direction from the armature 54 such that the armature 54 rotates about axis 24. The electric motor 20 also includes a stator 59 with a motor frame 60, a pair of permanent magnets 62, and a flux carrier 64. Each magnet 62 is in the shape of a segment of a hollow cylinder. The flux carrier 64 is made of a ferromagnetic material and may take the form of a cylindrical tube. The flux carrier 64 closely radially surrounds the motor frame 60 and the magnets 62. The flux carrier 64 may be made, for example, from a sheet of ferromagnetic material formed to shape by a rolling process. The stator 59 circumferentially surrounds the armature 54 such that a fluid passage 65 is defined radially between the armature 54 and the stator 59 and such that fuel flows axially through a fluid passage 65 from the inlet 34 to the outlet 52. The motor frame 60 includes a top section 66 that is proximal to the outlet section 16, a plurality of circumferentially spaced legs 68 extending axially from the top section 66 toward the pump section 12, and a base section 70 axially spaced apart from the top section 66 by legs 68. The top section 66, the legs 68, and the base section 70 are preferably integrally formed from a single piece of plastic, for example, by a plastic injection molding process.

The top section 66 of the motor frame 60 includes a first electrical terminal 72 and a second electrical terminal 74 extending therefrom and protruding through the end cap 50. The first electrical terminal 72 and the second electrical terminal 74 are arranged to be connected to a power source (not shown) such that the first electrical terminal 72 and the second electrical terminal 74 are opposite in polarity. The first electrical terminal 72 and the second electrical terminal 74 may be disposed within pre-formed openings in the top section 66 or the first electrical terminal 72 and the second electrical terminal 74 may be insert molded with the top section 66 when the motor frame 60 is formed by a plastic injection molding process. The first electrical terminal 72 is in electrical communication with a first carbon brush 76 while the second electrical terminal 74 is in electrical communication with a second carbon brush 78. The first carbon brush 76 is disposed within a first brush holder 80 that is defined by the top section 66 and is urged into contact with the commutator portion 58 of the armature 54 by a first brush spring 82 that is grounded to the end cap 50. The second carbon brush 78 is disposed within a second brush holder 84 defined by the top section 66 and is urged into contact with the commutator portion 58 of the armature 54 by a second brush spring 86 that is grounded to the end cap 50. The first carbon brush 76 and the second carbon brush 78 deliver electrical power to the motor windings 56 via the commutator portion 58, thereby rotating the armature 54 and the shaft 22 about axis 24 in use. The top section 66 of the motor frame 60 defines an upper bearing 88 therein which radially supports an upper end 90 of the shaft 22 that is proximal to the outlet section 16. The shaft 22 is able to rotate freely within the upper bearing 88 such that radial movement of the shaft 22 within the upper bearing 88 is limited to the manufacturing tolerances of the shaft 22 and the upper bearing 88.

In operation, the inlet 34 is exposed to a volume of fuel (not shown) which is to pumped to, for example, an internal combustion engine (not shown). An electric current is supplied to the motor windings 56 in order to rotate the shaft 22 and the impeller 28. As the impeller 28 rotates, fuel is drawn through the inlet 34 into the inlet plate flow channel 36. The impeller blade chambers 49 allow fuel from the inlet plate flow channel 36 to flow to the outlet plate flow channel 42. The impeller 28 subsequently discharges the fuel through the outlet plate outlet passage 40 and consequently through the outlet 52.

For proper operation and maximum efficiency, it is important to ensure proper orientation of the inlet plate 26 relative to the outlet plate 30 about axis 24, and to maintain the proper orientation up until the inlet plate 26 and the outlet plate 30 are fixed relative to the housing 18, such as, for example, by crimping the axial ends of the housing 18. As described in more detail below, the method of assembling the pump section 12 of the fuel pump 10 disclosed herein maintains the correct alignment and orientation of the inlet and outlet plates 26, 30 so that the pump section 12 can be handled and moved during later steps of assembling the fuel pump 10 without disturbing the relative positions of the inlet and outlet plates 26, 30.

With reference now to FIGS. 2 and 4-7, the inlet plate 26 includes an inlet plate outer peripheral surface **26*a* which surrounds axis 24 and which faces away from axis 24 toward a housing inner surface 18*a* of the housing 18. Likewise, the outlet plate 30 includes an outlet plate outer peripheral surface 30*a* which surrounds axis 24 and which faces away from axis 24 toward the housing inner surface 18*a* of the housing 18. At least one pair of complementary slots are formed in the inlet plate 26 and the outlet plate 30. Particularly, an inlet plate slot 27 is formed adjacent the inlet plate outer peripheral surface 26*a*, and a corresponding outlet plate slot 31 is formed adjacent the outlet plate outer peripheral surface 30*a*. An axially extending inlet plate opening 29 is formed in the inlet plate outer peripheral surface 26*a* adjacent the inlet plate slot 27, and likewise an axially extending outlet plate opening 33 is formed in the outlet plate outer peripheral surface 30*a* adjacent the outlet plate slot 31. The axially extending openings 29, 33 are contiguous with and merge into the inlet plate slot 27 and outlet plate slot 31, respectively, and open the slots 27, 31 to the periphery of the inlet and outlet plates 26, 30. Preferably, the inlet and outlet plates 26, 30 are formed to include a plurality of pairs of complementary inlet and outlet plate slots 27, 31, and as shown by example, in some embodiments the inlet plate 26 includes two inlet plate slots 27 disposed approximately 180 degrees from each other along the circumference of the inlet plate outer peripheral surface 26*a*, and the outlet plate 30 correspondingly includes two outlet plate slots 31 likewise disposed approximately 180 degrees from each other along the circumference of the outlet plate outer peripheral surface 30*a*. As will become more apparent from the discussion below, the inlet plate slots 27 and the outlet plate slots 31 are positioned on the inlet plate 26 and outlet plate 30, respectively, such that when the inlet plate slots 27 are aligned with the outlet plate slots 31, the inlet plate 26 is properly oriented relative to the outlet plate 30 about axis 24**.

Figure 6:
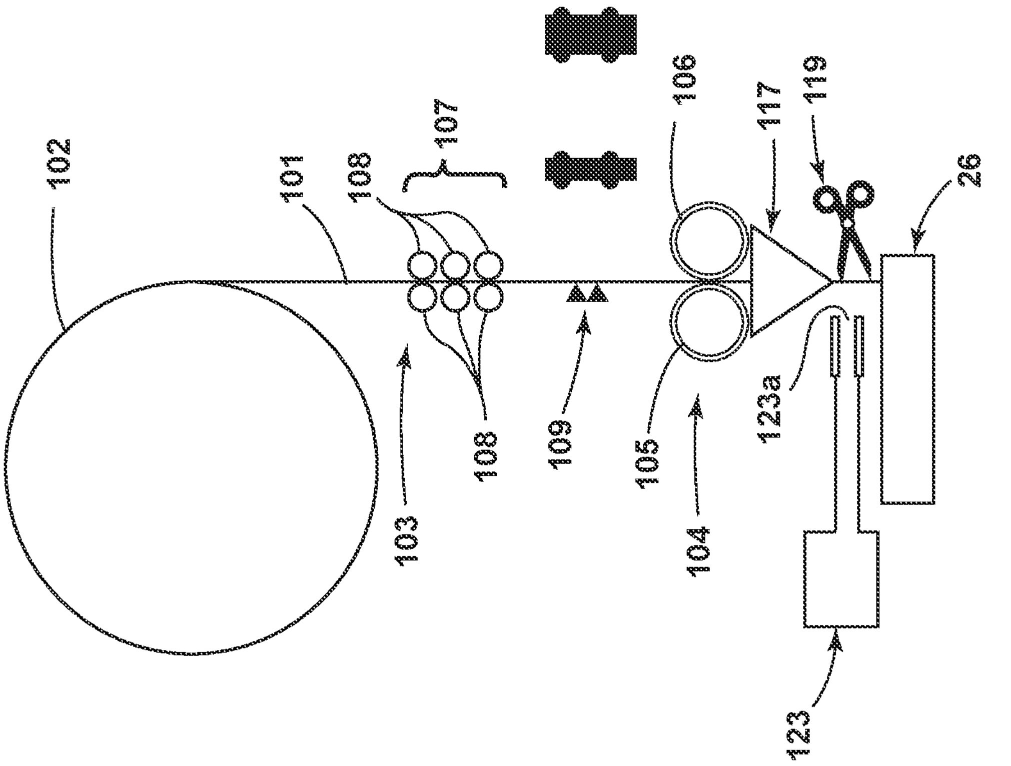
FIG. 6 is a schematic view of a system and method of assembling a pump section of a fluid pump in accordance with some embodiments of the disclosure.
Figure 7:
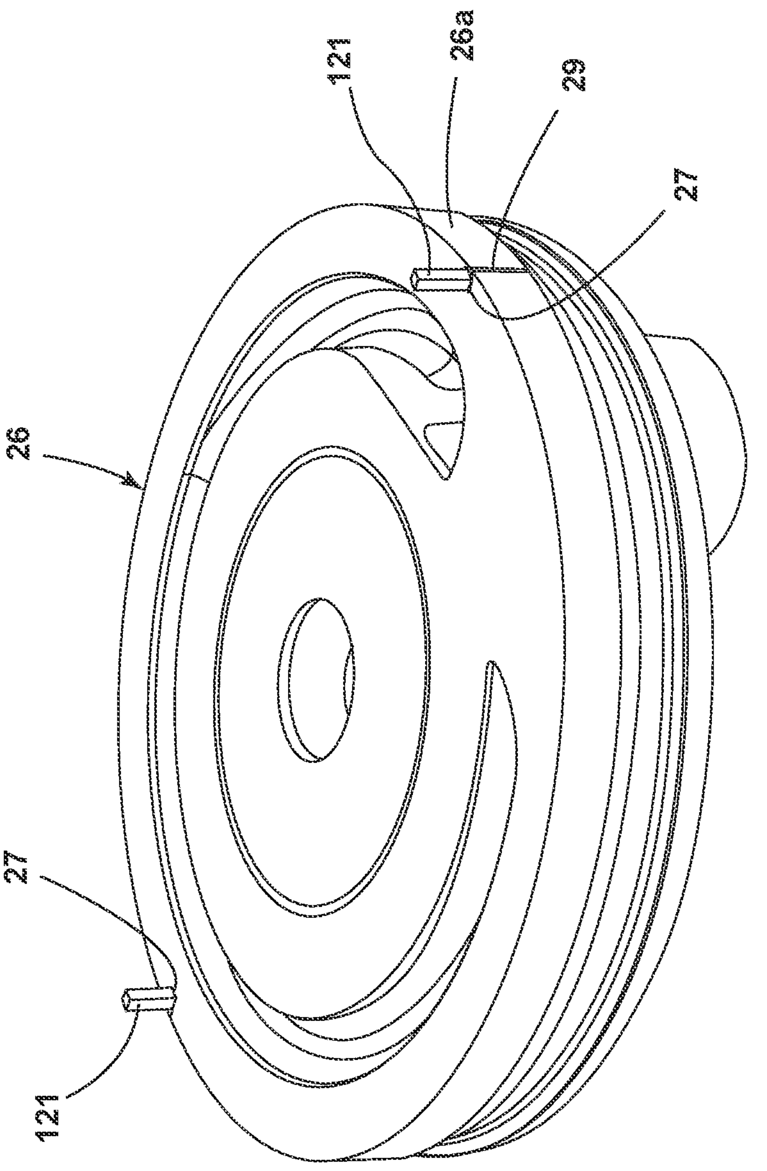
FIG. 7 is a perspective view of an inlet plate and cut metal wire of the pump section of FIG. 4.
Figure 8:
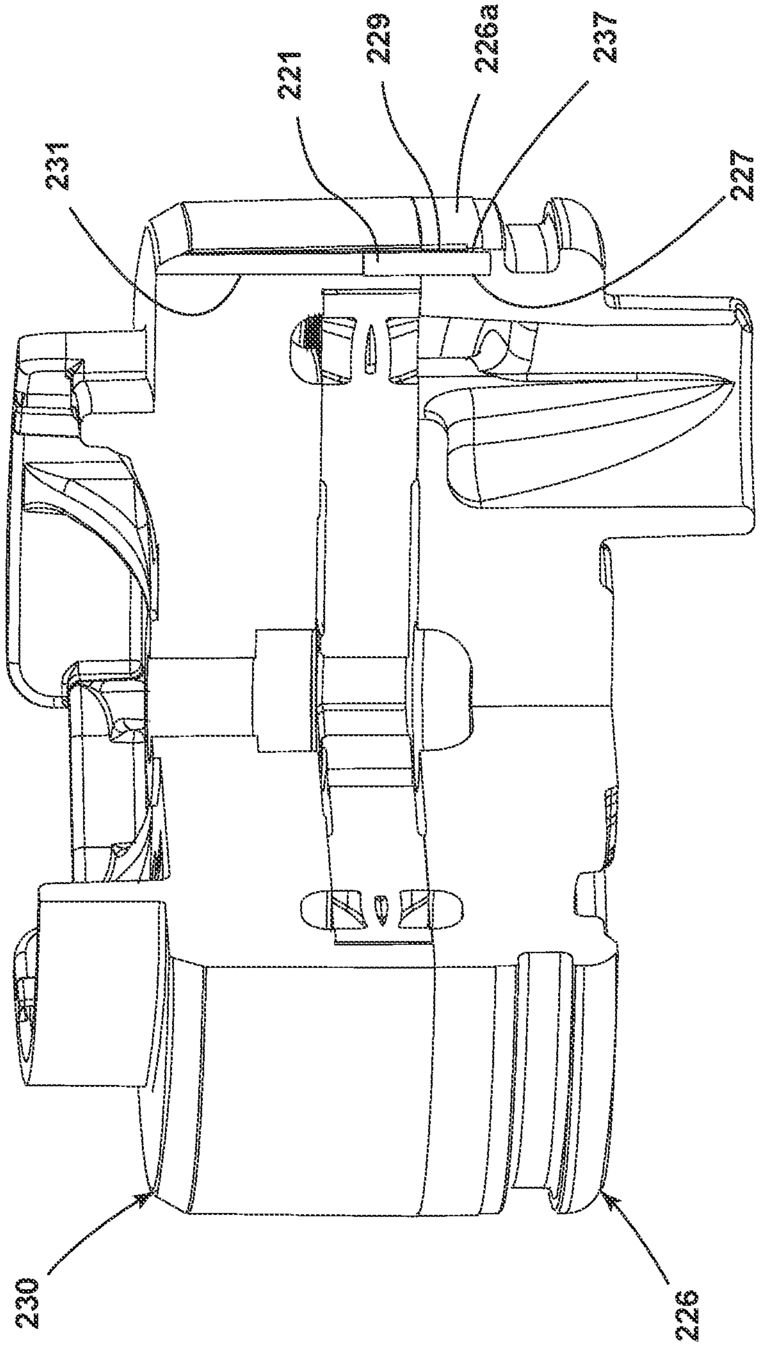
FIG. 8 is a partial sectional view of the pump section in accordance with other embodiments of the disclosure.
Figure 9:
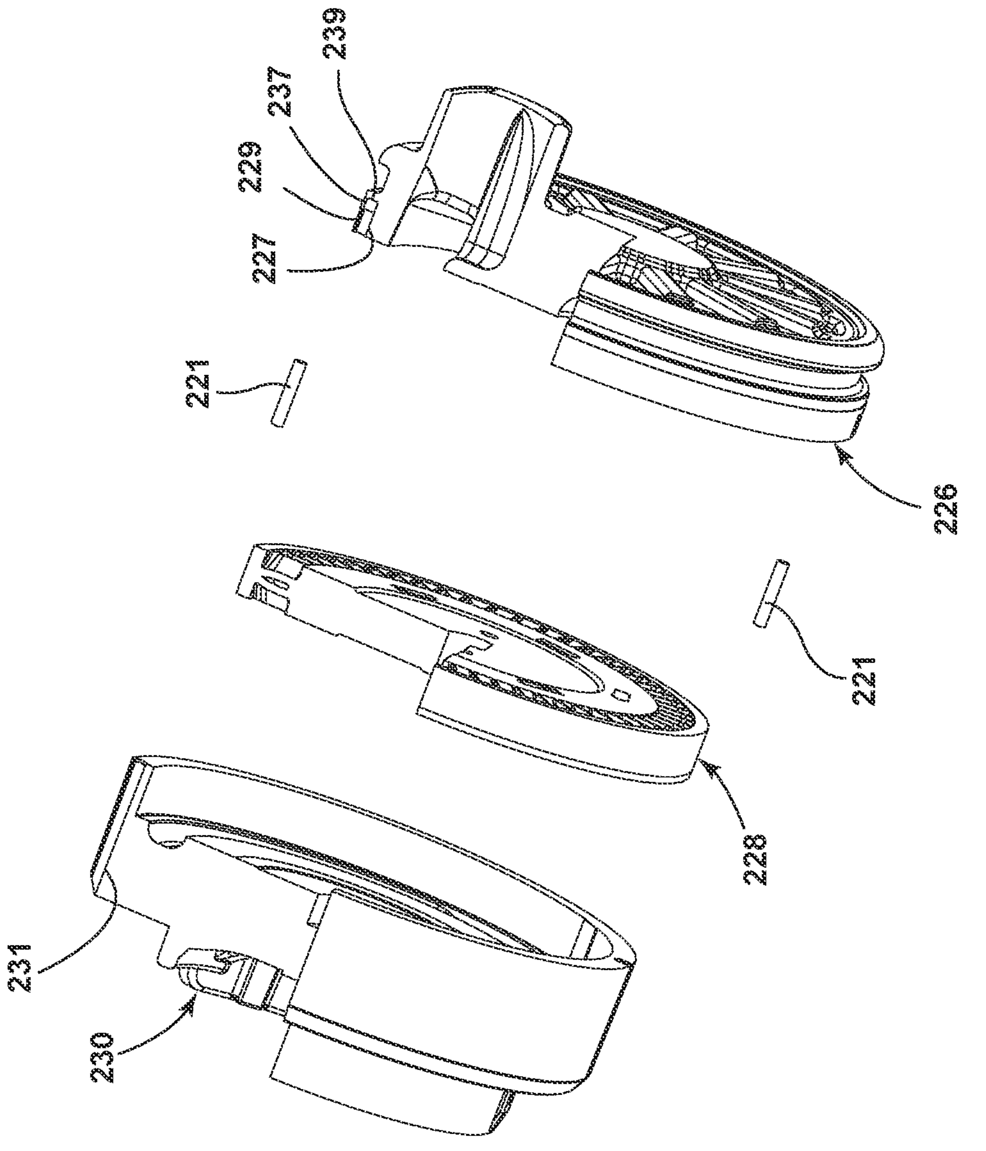
FIG. 9 is an exploded perspective view of the pump section of FIG. 8.
Figure 10:
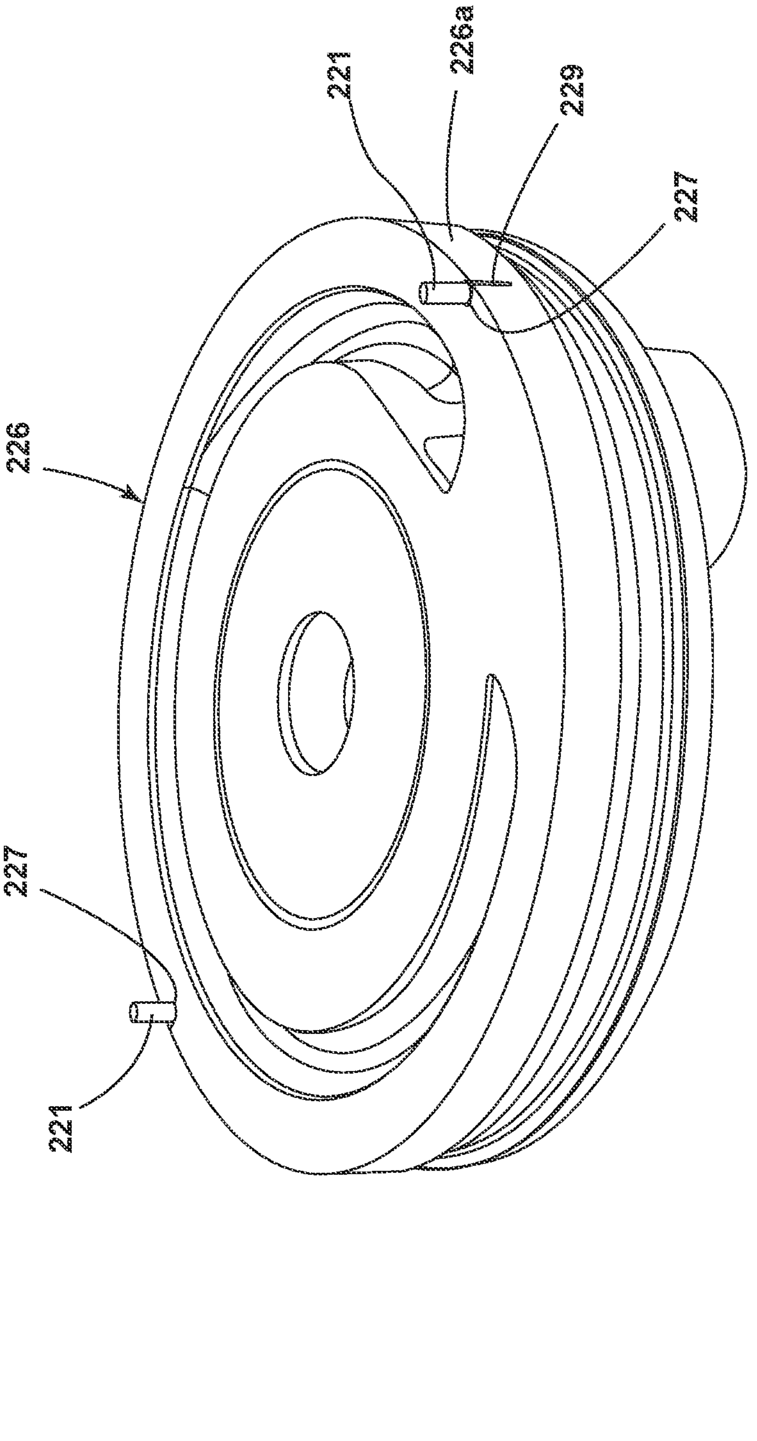
FIG. 10 is a perspective view of an inlet plate and cut metal wire of the pump section of FIG. 8.
Figure 11:
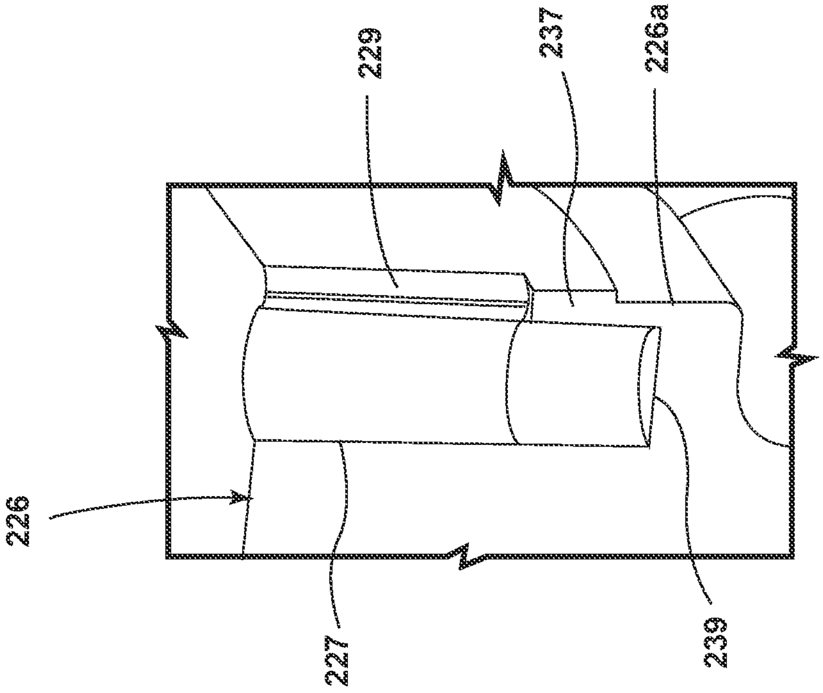
FIG. 11 is an enlarged view of an inlet plate slot of the inlet plate of FIG. 10, prior to insertion of the metal wire.
Figure 12:
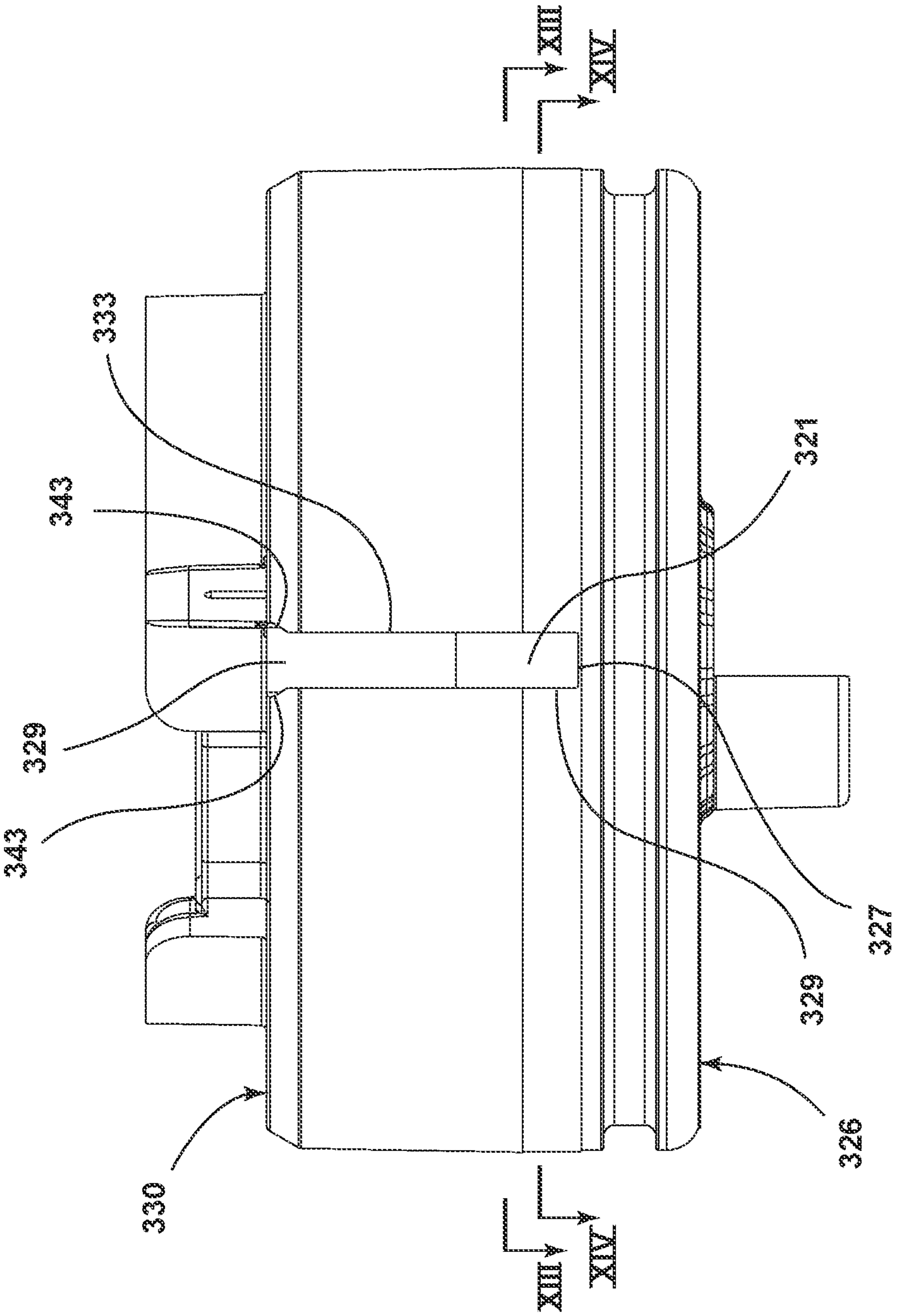
FIG. 12 is a side view of the pump section in accordance with yet other embodiments of the disclosure.
Figure 14:
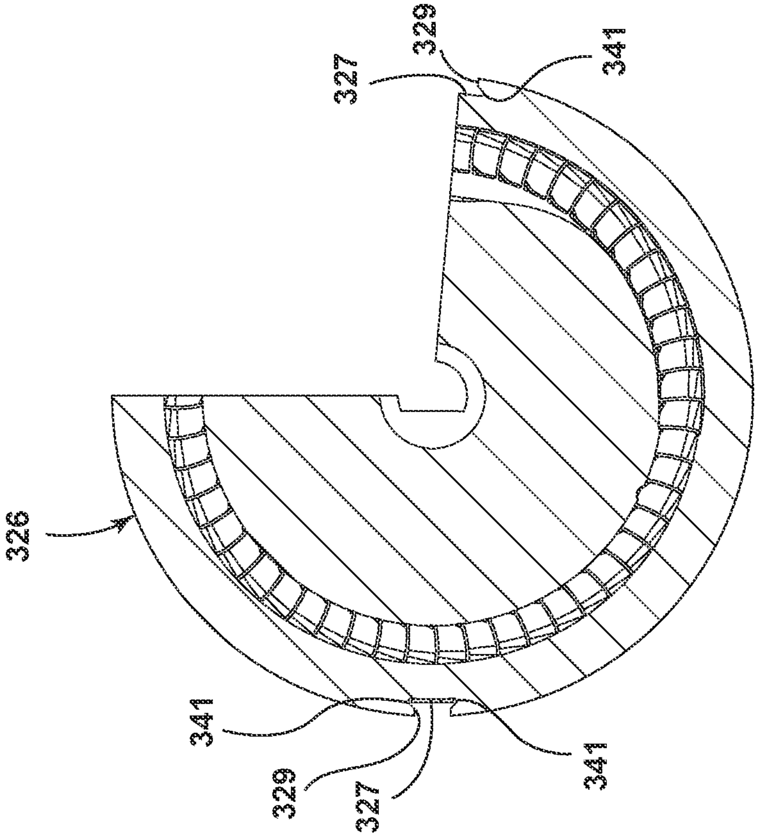
FIG. 14 is a sectional view of an inlet plate of the pump section of FIG. 12, with a portion of the inlet plate removed.
Figure 13:
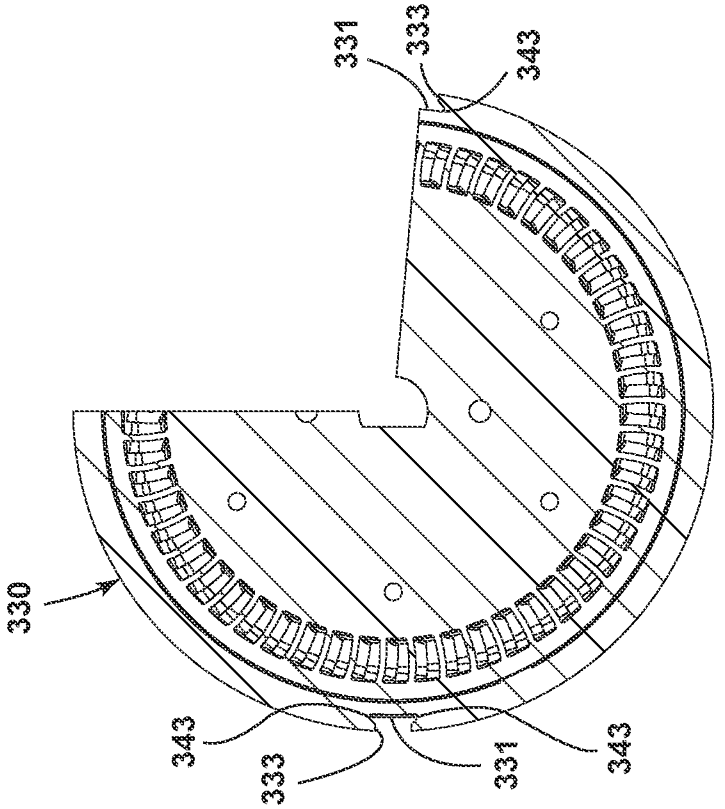
FIG. 13 is a sectional view of an outlet plate of the pump section of FIG. 12, with a portion of the outlet plate removed.
Figure 15:
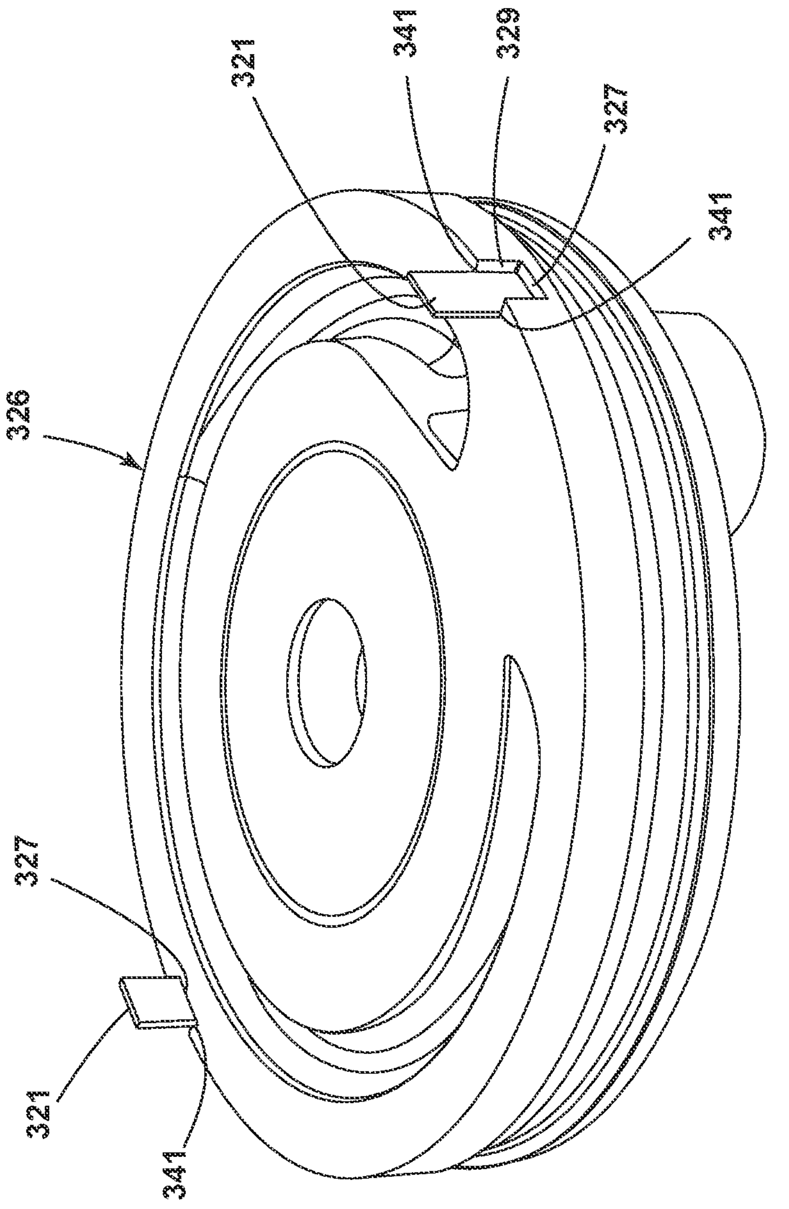
FIG. 15 is a perspective view of the inlet plate and cut metal wire of the pump section of FIG. 12.

In an assembly system shown in FIG. 6 for assembling the pump section 12, a metal wire 101 is fed from a supply of metal wire such as roll of wire 102. The metal wire may have a circular or polygonal cross-section, depending in part on the shape of the inlet and outlet plate slots 27, 31, and vice versa. In the embodiments shown in FIGS. 4-7, the metal wire 101 is a square wire having a generally square cross-sectional shape. As can be appreciated, the metal wire 101, being stored on and fed from a roll 102, will have a natural bend as it is dispensed from the roll 102. Therefore, the metal wire 101 preferably is first fed from the roll of wire 102 to a straightener 103. The metal wire 101 is fed from the roll of wire 102 and pulled through the straightener 103 by a pair of feed rollers 104 including a drive roll 105 and an idler roll 106. The feed rollers 104 are located downstream from the straightener 103 which allows the feed rollers 104 to pull the metal wire 101 through the straightener 103. The straightener 103 may be a set of rollers 107 including at least one pair of rolls 108. For example, the straightener 103 may include three pairs of rolls 108 that nip the metal wire 101, but it should be understood that the straightener may have more or less than three pairs of rolls. The metal wire 101 passes between each pair of rolls 108 which reduces or eliminates the bend in the metal wire 101.

Optionally, a forming tool 109 may be located downstream from the straightener 103 and between the straightener 103 and the feed rollers 104. The forming tool 109 may be a stamp or punch that stamps the metal wire 101 after the bend in the metal wire 101 has been reduced or removed. The forming tool 109 forms holes in the metal wire 101 along an edge of the metal wire 101 which in turn creates deformation zones in which the width of the metal wire 101 is made larger. As will be described in more detail below, the forming tool 109 may be configured to form four holes and a corresponding four deformation zones in the metal wire 101.

After straightening and the optional stamping by the forming tool 109, the feed rollers 104 push the metal wire 101 through a guide 117 that guides the wire to one of the inlet plate 26 of the pump section 12 or the outlet plate 30 of the pump section 12. Preferably the metal wire 101 is guided to the inlet plate 26, but the metal wire 101 may alternatively be guided to the outlet plate 30. For example, as shown schematically in FIG. 6 and with reference also to FIG. 7, the metal wire 101 may be guided sequentially to each of the two inlet plate slots 27 formed in the outer peripheral surface 26*a* of the inlet plate 26. The guide 117 is first aligned with one of the inlet plate slots 27 to cause the metal wire 101 to be fully inserted into the inlet plate slot 27 as the metal wire 101 is pushed through the guide 117 by the feed rollers 104. Either the guide 117 may move to the correct position relative to the inlet plate 26, or the inlet plate 26 is moved to and positioned so that the inlet plate slot 27 is properly aligned with the guide 117. Once the metal wire 101 is fully inserted into the inlet plate slot 27, the metal wire 101 is cut by a cutting tool 119 at a desired length such that a portion of the cut wire 121 remains extending from the inlet plate slot 27. The desired length typically corresponds to the length of the slot in the other plate or may be shorter than the length of the slot in the other plate, in this case the outlet plate slot 31 in the outlet plate 30, so that the length of wire extending from the inlet plate slot 27 in the inlet plate 26 may be inserted into the outlet plate slot 31 in the outlet plate 30 as discussed below. After cutting the metal wire with the cutting tool 119, the guide 117 is likewise aligned with the other inlet plate slot 27 in the inlet plate 26, the metal wire 101 is passed through the guide 117 and inserted into the other inlet plate slot 27, and the metal wire 101 is cut by the cutting tool 119 at the desired length. The inlet plate openings 29 along the inlet plate slots 27 reduce the amount of surface area contact between the metal wire 101 and the inlet plate 26 when the metal wire 101 is inserted into the inlet plate slots 27, thereby avoiding excess interference between the metal wire 101 and the inlet plate slots 27 that may occur due to part-by-part size variation of the inlet plate slots 27 in the inlet plate 26 and/or variation in the size of the metal wire 101. Further, if the forming tool 109 forms deformation zones in the metal wire 101 (see below), these deformation zones provide specific areas of increased interference between the metal wire 101 and the inlet plate slots 27 that aid in securing the metal wire 101 in the inlet plate slots 27.

In an alternative arrangement, in the case that the inlet plate 26 and outlet plate 30 have at least two pairs of complementary inlet and outlet plate slots 27, 31, the metal wire 101 may be guided and inserted into at least one inlet plate slot 27 in the inlet plate 26 and at least one outlet plate slot 31 in the outlet plate 30. For example, in the case that the plates 26, 30 have two pairs of slots 27, 31, the metal wire 101 may be guided to one of the inlet plate slots 27 in the inlet plate 26 and one of the outlet plate slots 31 in the outlet plate 30, wherein the outlet plate slot 31 in the outlet plate 30 is of the other pair of slots in relation to the inlet plate slot 27 in the inlet plate 26 in which the metal wire 101 is inserted. In other words, if the inlet and outlet plates 26, 30 have a pair A of complementary slots 27, 31 that are to be aligned together and a pair B of complementary slots 27, 31 that are also to be aligned together, the metal wire 101 is inserted into the inlet plate slot 27 of the inlet plate 26 corresponding to pair A and the outlet plate slot 31 of the outlet plate 30 corresponding to pair B.

A vacuum source 123 may be included, and an inlet 123*a* of the vacuum source 123 may be positioned, for example, in the vicinity of the cutting tool 119 and/or guide 117 to provide vacuum suction that can remove any loose particle generated during the insertion or cutting of the metal wire 101 so that no loose metal particles or other debris gets trapped within the inner passages of the inlet plate 26 or outlet plate 30. Although not shown, vacuum suction can likewise be provided by the vacuum source 123 in the vicinity of the straightener 103 or the forming tool 109.

Once the metal wire 101 is inserted into the inlet plate slots 27 and/or outlet plate slots 31 and cut as described above to form a cut wire 121, the inlet plate 26 and/or outlet plate 30 may be moved to the next assembly step. Particularly, the impeller 28 is inserted into a recess 35 in the outlet plate 30, and the inlet plate 26 is positioned relative to the outlet plate 30 so that the inlet plate slots 27 of the inlet plate 26 are aligned with the outlet plate slots 31 of the outlet plate 30. Considering the example in which the portions of the cut metal wire 121 are inserted in the inlet plate slots 27 of the inlet plate 26 and extend therefrom, the inlet plate 26 is placed on top of the outlet plate 30 and the plates 26, 30 are pressed together and the portions of the cut metal wire 121 extending from the inlet plate 26 are inserted into and received in the outlet plate slots 31 in the outlet plate 30, thereby forming the pump section 12 by aligning and axially securing the inlet and outlet plates 26, 30 together. Since the portions of the cut metal wire 121 are interference fit into the inlet and outlet plate slots 27, 31, the portions of the cut metal wire 121 hold the inlet and outlet plates 26, 30 together, and keep the plates 26, 30 together while the pump section 12 is further assembled into the housing 18 of the pump 10. Also, due to the positioning of the slots 27, 31 on both the inlet plate 26 and outlet plate 30, the relative positions of the inlet plate 26 and outlet plate 30 about axis 24 is assured and maintained.

In the embodiment shown in FIGS. 8-11, the inlet plate slots 227 of the inlet plate 226 and the outlet plate slots 231 of the outlet plate 230 are instead sized and shaped to receive a round (circular cross-section) metal wire. The inlet plate slots 227 and/or outlet plate slots 231 of this embodiment have a recessed portion 237 in the form of a draft at a terminal end 239 of each slot, as shown by example in one of the inlet plate slots 227 of the inlet plate 226. The recessed portion 237 is entirely within the inlet plate outer peripheral surface 226*a* such that the axially extending opening 229 stops in the axial direction at the recessed portion 237 in order to create an additional press fit interface between the inlet plate slot 227 and the cut metal wire 221 inserted into the inlet plate slot 227. The cut metal wire 221 is entirely concealed within the recessed portion 237. The embodiment of FIGS. 4, 5, and 7, in which the metal wire is a square wire may also include the feature of the recessed portion.

Figure 16:
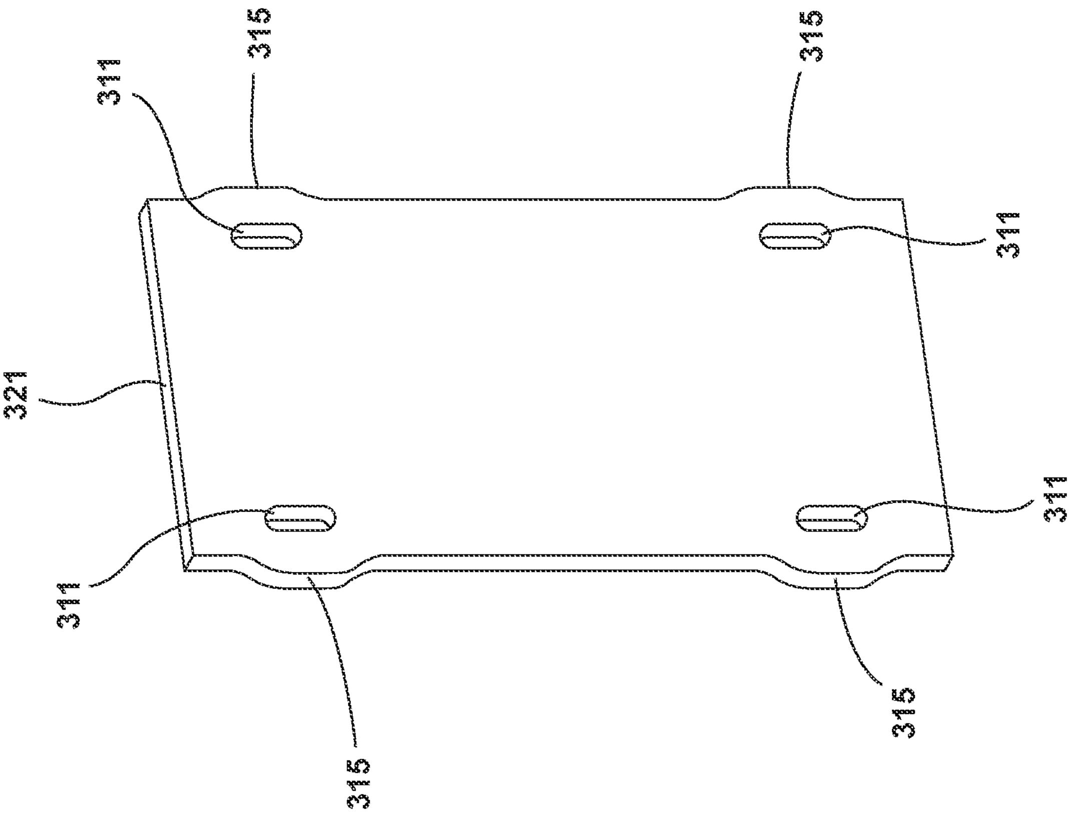
FIG. 16 is a perspective view of a cut metal wire in accordance with particular embodiments of the disclosure.

In the embodiment shown in FIGS. 12-16, the inlet plate slots 327 of the inlet plate 326 and the outlet plate slots 331 of the outlet plate 329 are instead sized and shaped to receive a flat strip of metal wire being generally planar and having a width that is much greater than its thickness. The inlet plate slots 327 of this embodiment include inlet plate grooves 341 and the outlet plate slots 331 of this embodiment include outlet plate grooves 343 that are adjacent edges of the axially extending openings 329, 333 in both the inlet plate 326 and outlet plate 330. The inlet plate grooves 341 are continuous with and merge into the inlet plate slots 327, and the outlet plate grooves 343 are continuous with and merge into the outlet plate slots 331. The inlet and outlet plate grooves 341, 343 aid in holding the flat strips of cut metal wire 321 within the inlet and outlet plate slots 327, 331, respectively, and prevent the flat strips of cut metal wire 321 from exiting the slots 327, 331 through the inlet and outlet plate openings 329, 333. The embodiment of FIGS. 4, 5, and 7, in which the metal wire is a square wire may also include the feature of the grooves. In addition, as shown in FIG. 16, the forming tool 109 may be used in this embodiment to punch the holes 311 into the flat metal strip 321 and simultaneously to form the deformation zones 315 in which the width of the flat strip of cut wire 321 is made larger, i.e. bumps are formed along the edges 313 of the wire. Once the flat strip of wire is cut, the holes 311 and deformation zones 315 are located near the four corners of the cut metal strip 321. The deformation zones 315 at one end of the cut metal strip provide an interference fit with the inlet plate slot 327 when the metal strip is inserted and received in the inlet plate slot 327, and likewise the deformation zones 315 at the other end of the cut metal strip 321 provide an interference fit with the outlet plate slot 331 when the metal strip 321 is inserted and received in the outlet plate slot 331. A square metal wire may similarly be formed to include the holes and deformation zones.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A method of assembling a pump section of a fluid pump, the method comprising the steps of:

providing a pump inlet plate and a pump outlet plate, wherein the inlet plate includes an inlet plate slot and the outlet plate includes a complementary outlet plate slot;

feeding a metal wire from a supply of metal wire to a straightener;

pulling the metal wire through the straightener to reduce a bend in the metal wire;

guiding the straightened metal wire to one of the inlet plate and outlet plate;

causing the guided, straightened metal wire to be inserted into the slot of the said one of the inlet plate and outlet plate; and subsequent to inserting the guided, straightened metal wire into the slot, and while the metal wire is inserted in the slot, cutting the metal wire at a desired length such that a portion of the cut wire remains extending from said slot.

2. The method of claim 1, further including the steps of aligning the outlet plate slot with the inlet plate slot, and placing the inlet plate on top of the outlet plate such that the portion of cut wire extending from the slot in the said one of the inlet plate and outlet plate is received in the slot in the other of the inlet plate and outlet plate, thereby aligning and axially securing the inlet and outlet plates together.

3. The method of claim 1, further including the step of stamping the metal wire with a forming tool after reducing the bend in the metal wire with the straightener.

4. The method of claim 3, wherein the step of stamping forms holes in the metal wire along an edge of the metal wire to create deformation zones in which the width of the metal wire is made larger.

5. The method of claim 3, wherein the forming tool is a punch.

6. The method of claim 1, further including the step of providing vacuum suction to remove any loose particles generated during the method.

7. The method of claim 1, wherein the metal wire is a round wire, a square wire, or a flat strip of wire.

8. The method of claim 1, wherein the supply of metal wire is a roll of wire.

9. The method of claim 1, wherein the straightener is a set of rollers including at least one pair of rolls.

10. The method of claim 1, wherein the step of pulling includes feeding the wire through a pair of feed rollers.

11. The method of claim 10, wherein the feed rollers include a drive roll and a corresponding idler roll.

12. The method of claim 1, wherein at least one of the inlet plate slot and the outlet plate slot includes a recessed portion formed at a terminal end of said slot.

13. The method of claim 1, wherein the inlet plate includes an inlet plate outer peripheral surface and also includes an axially extending inlet plate opening in the inlet plate outer peripheral surface; and the outlet plate includes an outlet plate outer peripheral surface and also includes an axially extending outlet plate opening in the outlet plate outer peripheral surface.

14. The method of claim 13, wherein the inlet plate includes an inlet plate groove adjacent the inlet plate opening; and the outlet plate includes an outlet plate groove adjacent the outlet plate opening.

15. The method of claim 14, wherein the inlet plate groove is continuous with the inlet plate slot; and the outlet plate groove is continuous with the outlet plate slot.

16. The method of claim 1, wherein the inlet plate includes a second inlet plate slot and the outlet plate includes a corresponding second outlet plate slot, and the method further includes the steps of:

causing the metal wire to be inserted into the second slot of the said one of the inlet plate and outlet plate; and cutting the wire at a desired length such that a portion of the wire remains extending from said second slot.

17. A pump section formed by the method of claim 1.

18. A fluid pump including the pump section of claim 17.

* * * * *